United States Patent
Ruiz

(10) Patent No.: US 7,324,306 B2
(45) Date of Patent: Jan. 29, 2008

(54) SYSTEM, METHOD, AND APPARATUS FOR IMPROVING THE MULTIPLE VELOCITY PERFORMANCE AND WRITE ELEMENT PROTRUSION COMPENSATION OF DISK DRIVE SLIDERS

(75) Inventor: Oscar Jaime Ruiz, San Jose, CA (US)

(73) Assignee: Hitachiglobal Storage Technologies Netherlands BV, Amsterdam (NL)

( * ) Notice: Subject to any disclaimer, the term of this patent is extended or adjusted under 35 U.S.C. 154(b) by 700 days.

(21) Appl. No.: 10/844,100

(22) Filed: May 12, 2004

(65) Prior Publication Data

US 2005/0264913 A1  Dec. 1, 2005

(51) Int. Cl.
G11B 5/60 (2006.01)
(52) U.S. Cl. .............. 360/235.7; 360/235.4; 360/75
(58) Field of Classification Search .. 360/235.3–235.9, 360/236–236.9, 234.3, 237
See application file for complete search history.

(56) References Cited

U.S. PATENT DOCUMENTS

| 6,055,128 A | 4/2000 | Dorius et al. | |
|---|---|---|---|
| 6,462,909 B1 * | 10/2002 | Boutaghou et al. | 360/235.8 |
| 6,504,682 B1 * | 1/2003 | Sannino et al. | 360/235.8 |
| 6,515,831 B1 * | 2/2003 | Sannino et al. | 360/235.6 |
| 6,606,222 B1 | 8/2003 | Ryun | |
| 6,646,831 B1 * | 11/2003 | Takagi et al. | 360/234.3 |
| 6,879,464 B2 * | 4/2005 | Sun et al. | 360/236.3 |
| 2002/0008939 A1 * | 1/2002 | Boutaghou et al. | 360/235.8 |
| 2002/0089789 A1 | 7/2002 | Baba et al. | |
| 2002/0145829 A1 | 10/2002 | Gates | |
| 2002/0163762 A1 | 11/2002 | Levi | |
| 2002/0181153 A1 | 12/2002 | Kang | |
| 2003/0081352 A1 | 5/2003 | Rao et al. | |
| 2003/0128471 A1 | 7/2003 | Bolasna et al. | |
| 2003/0169535 A1 | 9/2003 | Boutaghou | |
| 2004/0156143 A1 * | 8/2004 | Kang | 360/235.8 |

FOREIGN PATENT DOCUMENTS

JP  20022312916  10/2002

* cited by examiner

Primary Examiner—Wayne Young
Assistant Examiner—Abdukader Muhammed
(74) Attorney, Agent, or Firm—Bracewell & Giuliani LLP

(57) ABSTRACT

An air bearing design enables a slider to fly at a higher fly height when the rotational speed of the disk is reduced to about one-third of its operational velocity. In addition, the slider has a flat profile as it scans the disk surface at a low fly height sigma, and low fly height loss during track seek and high altitude operation. This design also provides write protrusion compensation and thereby mitigates spacing losses due to the write current swelling of the write element protrusion. The leading region of the rear pad of the air bearing is mildly concave. This design produces unexpected results by compressing incoming air flow in such a way that, even under two very different velocities, good air bearing lift is generated while compensating for write element protrusion.

16 Claims, 4 Drawing Sheets

SYSTEM, METHOD, AND APPARATUS FOR IMPROVING THE MULTIPLE VELOCITY PERFORMANCE AND WRITE ELEMENT PROTRUSION COMPENSATION OF DISK DRIVE SLIDERS

BACKGROUND OF THE INVENTION

1. Technical Field

The present invention relates in general to an improved air bearing design for disk drive sliders and, in particular, to a system, method, and apparatus for a slider air bearing design for improved multiple velocity fly height performance and write element protrusion compensation.

2. Description of the Related Art

Data access and storage systems typically comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

An HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is typically composed of various shaped pads to glide over moving air in order to maintain a uniform distance from the surface of the rotating disk, thereby preventing the head from undesirably contacting the disk.

Typically, a slider is formed with a set of shaped pads lying over its surface closest to the disk and called the air bearing surface (ABS) along with cavities of various depths surrounding the aforementioned pads and called etched cavities that enable the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk.

In some disk drive systems, the slider performance must satisfy seemingly contradictory requirements. One requirement is that the slider must actually fly at a higher fly height when the rotational speed of the disk is reduced to about one-third of the disk drive operating velocity. In one application, the need for this lower velocity arises during the writing of a servo pattern. For example, if the product velocity is about 10,000 rpm and the product fly height is about 10 nm, the servo writing velocity is about 3,780 rpm and the minimum fly height at the outer diameter of the slider is about 11 nm.

In addition to the dual velocity requirement, the slider must provide a flat profile as it scans the disk surface from the inner diameter (ID) to the outer diameter (OD). This flat profile requirement includes a minimum variation in the fly height from part-to-part due to manufacturing tolerances (low fly height sigma), low fly height loss during track seek, and low fly height loss during operation of the disk drive at high altitudes above sea level geographical regions.

A third requirement for these types of sliders is to be able to compensate for write protrusion. At high data writing rates, significant heat is created within the magnetic head. The heat causes material expansion within the magnetic head and slider, which in turn makes regions of the air bearing surface to protrude away from their nominal surface toward the magnetic disk. This protrusion substantially reduces the clearance at the protrusion location, and increases the likelihood of solid contact between the slider air bearing surface and the disk surface. The swelling of the write element reduces the fly height by a significant fraction of the original spacing and therefore creates spacing losses between the slider and the disk.

There have been many attempts to address these requirements in the prior art. Conventional methods vary the air bearing surface structure and include the use of multiple etch depths, shaping of the pads, and shifting the suspension pivot location. Typically, the front end of the rear air bearing pad is made convex or bullet-shaped so as to avoid trapping particles during operation. Alternatively, very deep pockets such as U-shaped designs having an aspect ratio (i.e., depth to width ratio) of 2.0 or greater. Although each of these prior art solutions are workable to some degree, an improved slider air bearing design that more thoroughly satisfies all of the previously described requirements would be desirable.

SUMMARY OF THE INVENTION

One embodiment of a system, method, and apparatus constructed in accordance with the present invention comprises a slider air bearing design for improved multiple velocity fly height performance, flat profile performance, and write element protrusion compensation. The air bearing design enables the slider to fly at a higher fly height when the rotational speed of the disk is reduced to about one-third of its operational velocity. In addition, the slider has a flat profile as it scans the disk surface from ID to the OD, with a low fly height sigma, low fly height loss during track seek, and low fly height loss during operation at high altitudes. The present invention also provides write protrusion compensation and thereby mitigates spacing losses due to the swelling of the write element protrusion with write current.

One feature of the air bearing design is the shape of the rear pad along with the etch depths. The leading region of the rear pad is mildly concave, having an aspect ratio (i.e., depth to width ratio) of approximately 0.1 to 0.8. This design produces unexpected results by compressing incoming air flow in such a way that, even under two very different velocities, good air bearing lift is generated. The mild concavity also serves to make the read pad region sensitive to write protrusion growth by producing needed extra lift force that compensates for the clearance reduction caused by the write element protrusion.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
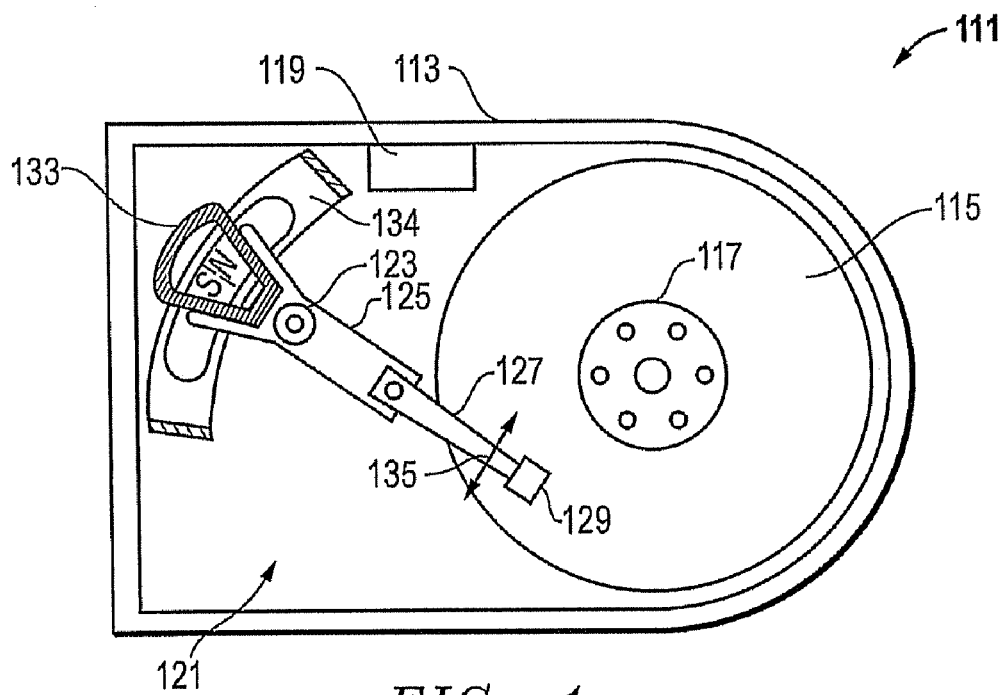
FIG. 1 is a simplified plan view of one embodiment of a disk drive constructed in accordance with the present invention.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly having a central drive hub assembly 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be nano size (approximately 850×700×230 microns) and is pre-loaded against the surface of disk 115 (in the range two to ten grams) by suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
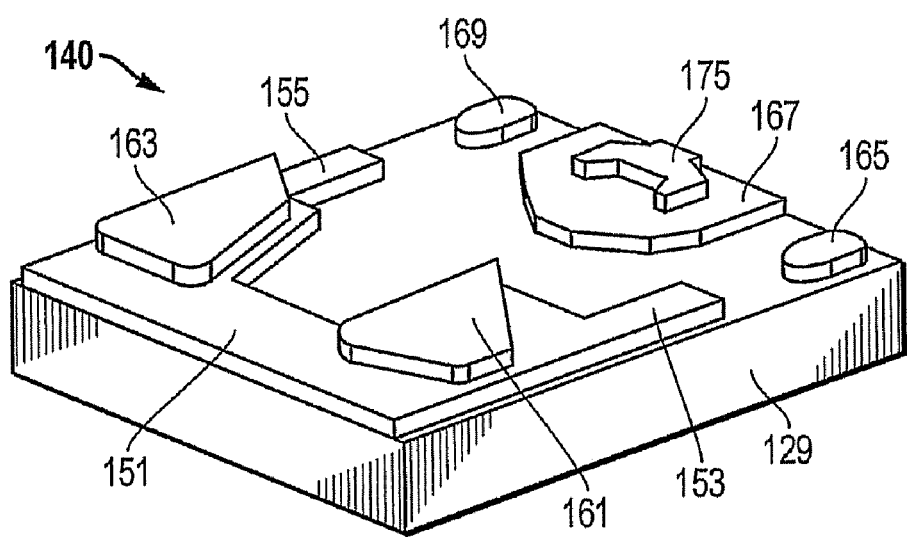
FIG. 2 is an isometric view of a slider air bearing surface constructed in accordance with the present invention that is used in conjunction with the disk drive of FIG. 1.
Figure 3:
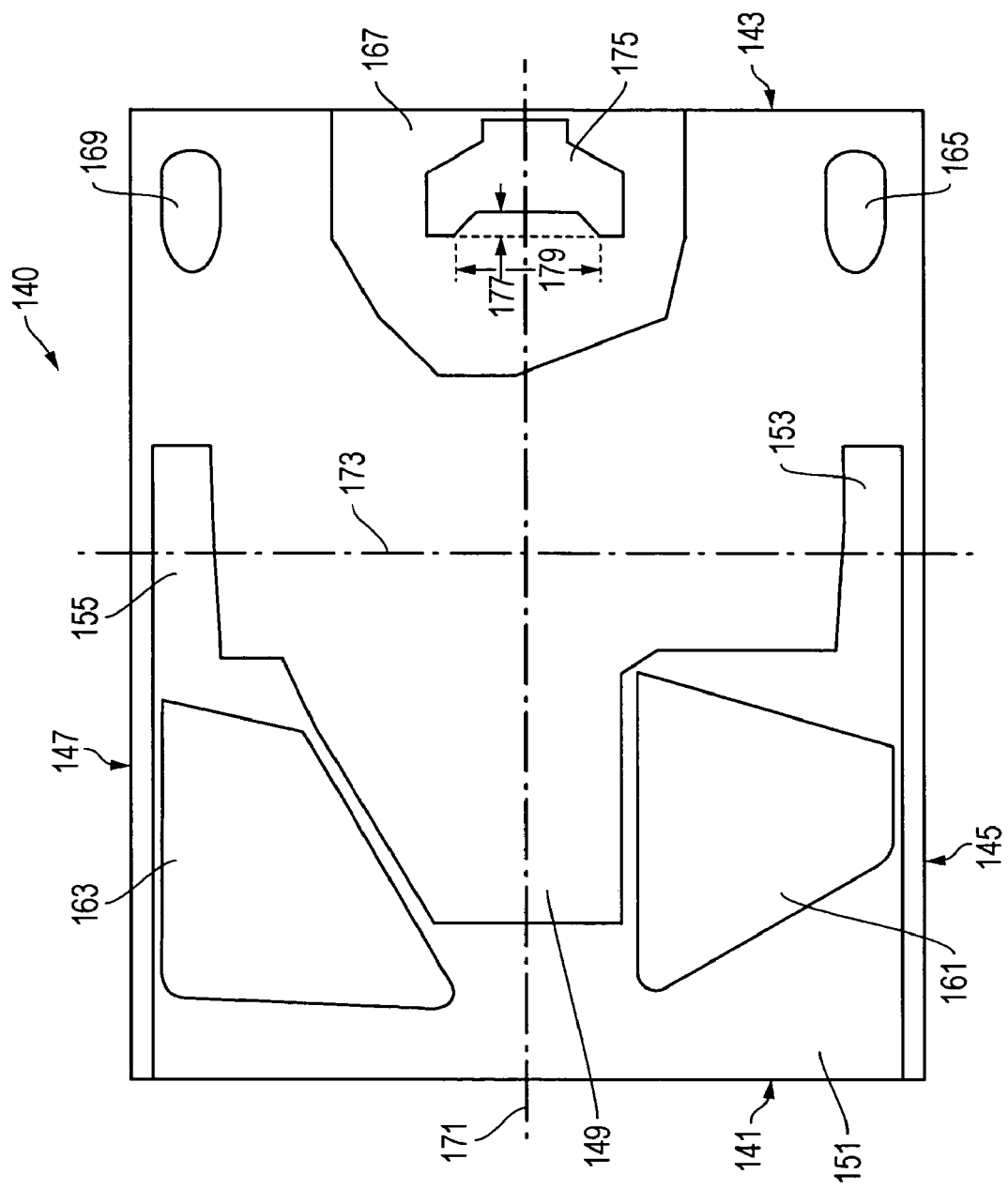
FIG. 3 is a two-dimensional plot of the x-y coordinates of the features of the slider air bearing surface of FIG. 2.

Referring now to FIGS. 2 and 3, detailed views of one embodiment of the air bearing surface (ABS) 140 of slider 129 are shown. One suggested embodiment of the x-y coordinates of the features on ABS 140 are shown in FIG. 3. Slider 129 is shown in a pico-size format, and ABS 140 has features that are formed at, for example, two etch depths: shallow (e.g., 0.18 micron) features, and deeper (e.g., 1.7 micron—the sum of 0.18 micron and 1.52 micron) features. By way of example, the gram load may comprise 2 grams and the load pivot is located at the center (intersection of axes 171, 173) of the slider 129.

ABS 140 has a leading edge 141, a trailing edge 143, a pair of lateral edges 145, 147 extending therebetween, and a generally planar base surface 149 defined between the boundaries of edges 141, 143, 145, 147. In the version shown, lateral edge 145 is closest to the inner diameter of the disk 115 (FIG. 1), and lateral edge 147 is closest to the outer diameter edge of disk 115.

ABS 140 has a generally U-shaped leading edge pad 151 that is aligned with the leading edge 141. The "arms" 153, 155 of leading edge pad 151 extend rearward from leading edge 141 alongside but slightly offset from lateral edges 145, 147. Two generally trapezoidal intermediate pads 161, 163 are formed on top of leading edge pad 151 near leading edge 141. Again, one embodiment of the precise locations, shapes, and sizes of these features are illustrated in FIG. 3.

Adjacent to the trailing edge 143, ABS 140 includes three trailing edge pads 165, 167, and 169. Trailing edge pads 165, 169 are very similar and are located adjacent to opposite corners of the trailing edge 143. Trailing edge pads 165, 169 are generally tapered, streamlined shapes and the smallest of all of the pads on ABS 140. Trailing edge pad 167 is located between trailing edge pads 165, 169 along a longitudinal axis 171 that bisects ABS 140 from side to side. A lateral axis 173 is perpendicular to longitudinal axis 171, and bisects the ABS 140 from front to back. Trailing edge pad 167 is much larger than trailing edge pads 165, 169, and actually abuts the trailing edge 143.

One additional pad 175 is located on top of trailing edge pad 167 and is important for providing the desired performance for slider 129. Pad 175 is generally U-shaped and mildly concave along its leading edge. The leading edge of pad 175 has an aspect ratio in the range of approximately 0.1 to 0.8. As shown in FIG. 3, the aspect ratio is defined as the depth 177 of the concave leading edge of pad 175 over the width 179 of the concave leading edge of pad 175. To summarize, pads 161, 163, and 175 are formed at the shallow etch depth, and pads 151, 165, 167, and 169 are formed at the deep etch depth.

Figure 4:
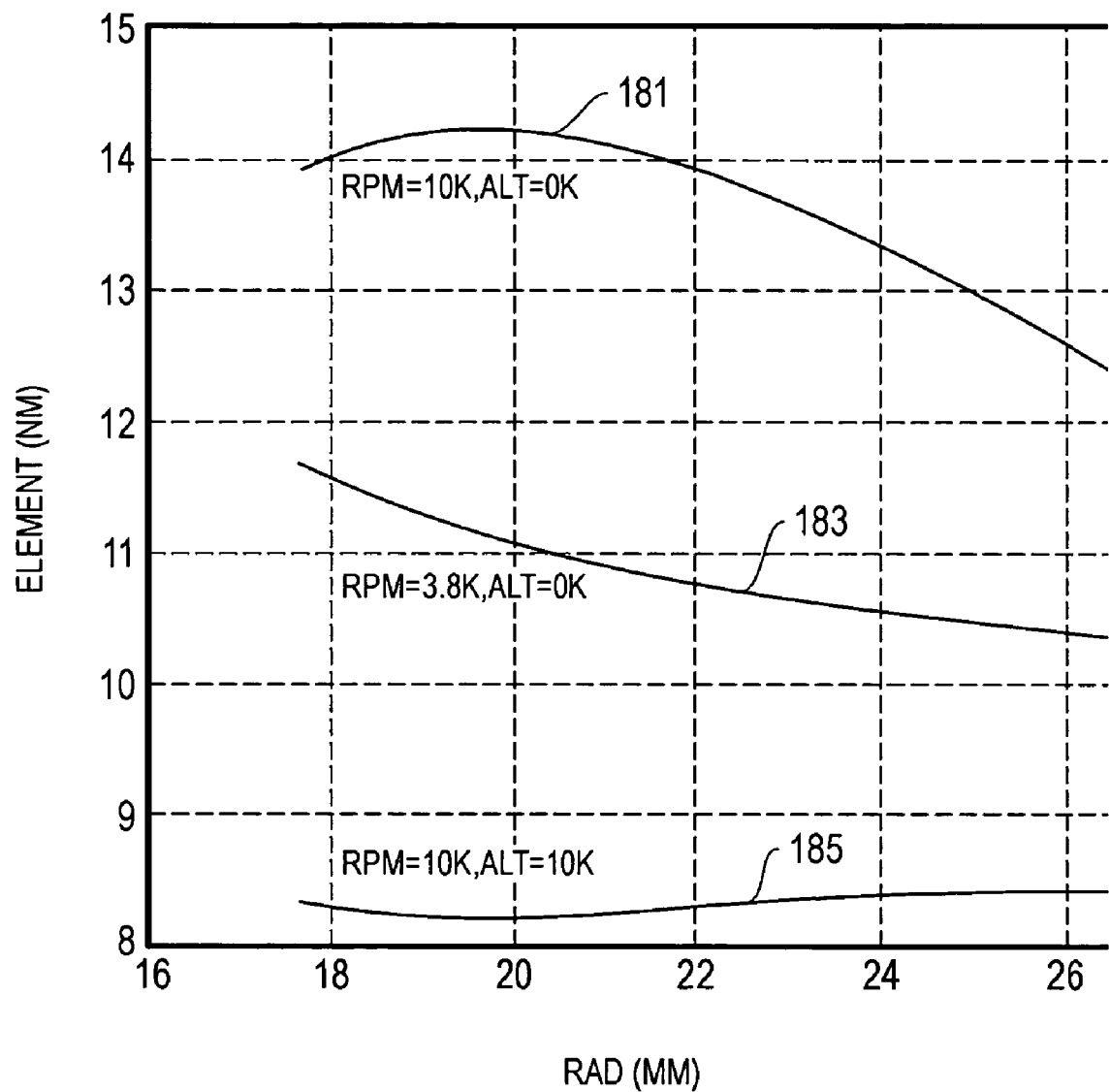
FIG. 4 depicts plots of the operation of the slider of FIGS. 2 and 3 at various velocities and altitudes.
Figure 5:
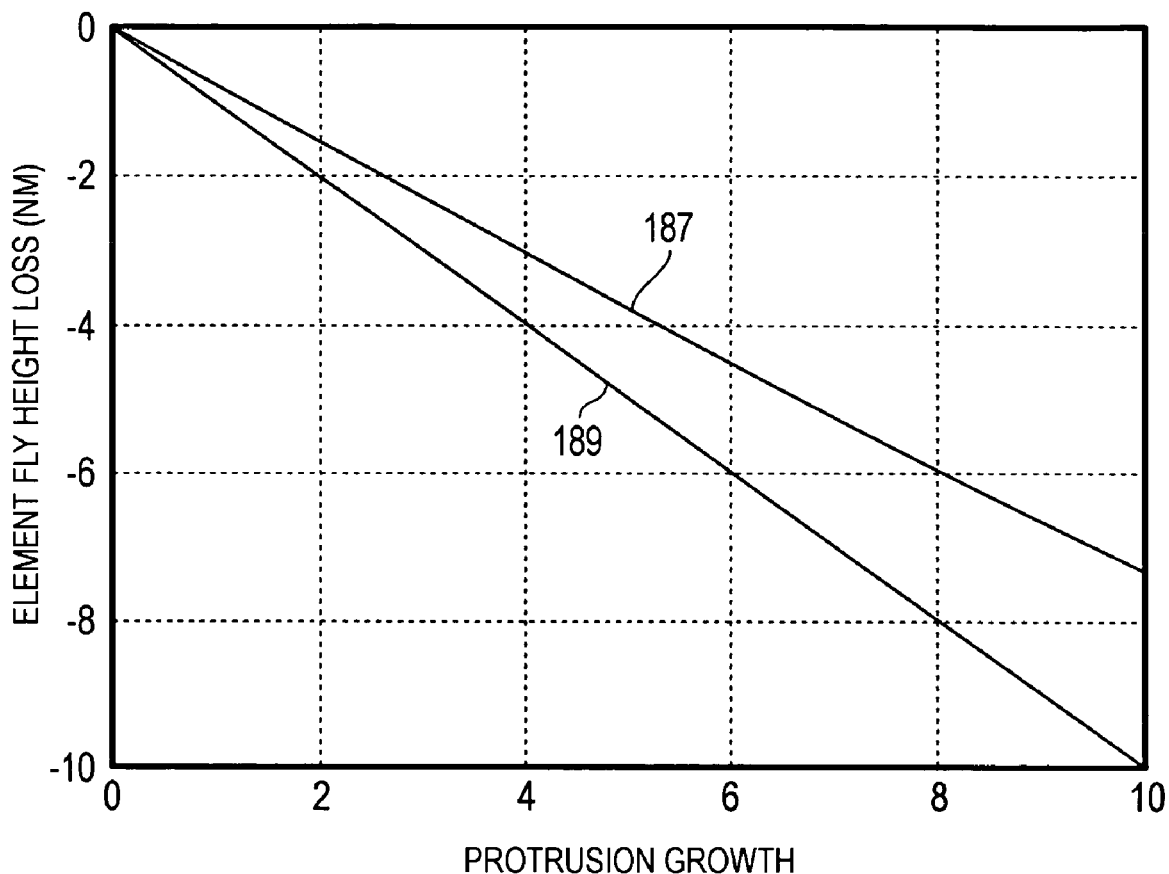
FIG. 5 illustrates the write protrusion compensation of the slider of FIGS. 2 and 3.

Examples of the improved performance of ABS 140 are depicted in FIGS. 4 and 5. FIG. 4 illustrates plots of the operation of the slider 129 at various velocities and altitudes showing, on the vertical axis, fly height, and, on the horizontal axis, radius distance from a center of the disk 115 (FIG. 1) going from the ID (left side) to the OD (right side). For example, plot 181 depicts the performance of ABS 140 while disk 115 is rotating at a normal product velocity of about 10,000 rpm at sea level. Plot 183 depicts the performance of ABS 140 while disk 115 is rotating at a servo writing velocity of about 3,800 rpm at sea level. Plot 185 depicts the performance of ABS 140 while disk 115 is rotating at a product velocity of 10,000 rpm, but at an altitude of 10,000 feet above sea level. These plots illustrate that ABS 140 can actually maintain slider 129 at a higher fly height at a lower speed than when it is operating at high speed at high altitude.

FIG. 5 illustrates the write protrusion compensation of the ABS 140 on slider 129. When write current is sent to the write element in slider 129, the write element has a tendency to swell by a small but nonetheless significant amount (e.g., a few nanometers), thereby reducing the spacing (fly height) between the slider 129 and the surface of disk 115. The present invention compensates for this "write protrusion" and thereby mitigates spacing losses due to the swelling of the write element. For example, plot 189 shows the loss in fly height if no compensation existed. Plot 189 illustrates that every 1 nm of protrusion growth directly results in a 1 nm loss of fly height. However, plot 187 depicts the performance of ABS 140 on slider 129, where a 1 nm protrusion growth results in less than a 1 nm loss of fly height. This is a performance improvement of approximately 25% over the prior art.

The present invention further comprises a method of improving multiple velocity fly height performance, flat profile performance, and write element protrusion compensation of a disk drive slider. One embodiment of the method comprises providing a disk drive 111; rotating a media disk 115 in the disk drive 111 at a media disk velocity of x rpm, and flying the slider 129 at a fly height of a nm relative to the media disk 115; and then rotating the media disk 115 at a servo writing velocity of y rpm (y<x) for writing a servo pattern, and flying the slider 129 at a fly height of b nm (b>a).

The method may comprise operating the disk drive 111 at a media disk velocity of about 10,000 rpm and a fly height is about 10 nm, and then a servo writing velocity of about 3,780 rpm at a fly height of about 11 nm. The method also may comprise performing the media disk velocity at an altitude of about 10,000 feet, and performing the servo writing velocity at an altitude of about sea level. The method may further comprise operating the disk drive 111 at sea level at the media disk velocity such that the fly height of the slider 129 is greater than the fly height of the slider 129 at the servo writing velocity at sea level.

Moreover, the method may further comprise sending write current to a write element in the slider 129 to swell the write element and thereby reducing the fly height between the slider 129 and the media disk 115, but compensating for the reduction in fly height with an air bearing surface of the slider 129. In addition, the method may comprises scanning the media disk 115 in a flat profile with the slider 129 from ID to OD, with a low fly height sigma, low fly height loss during track seek, and low fly height loss during operation at high altitudes.

The present invention has several advantages, including the ability to improve multiple velocity fly height performance, flat profile performance, and write element protrusion compensation. The air bearing design enables the slider to fly at a higher fly height when the rotational speed of the disk is reduced. In addition, the slider has a flat profile as it scans the disk surface from ID to the OD, with a low fly height sigma, low fly height loss during track seek, and low fly height loss during operation at high altitudes. The present invention also provides write protrusion compensation and thereby mitigates spacing losses due to the swelling of the write element protrusion with write current.

While the invention has been shown or described in only some of its forms, it should be apparent to those skilled in the art that it is not so limited, but is susceptible to various changes without departing from the scope of the invention.

What is claimed is:

1. A disk drive slider, comprising:
   a slider body;
   an air bearing surface on the slider body having a longitudinal axis, a lateral axis, a leading edge, a trailing edge, a pair of lateral edges extending between the leading and trailing edges, and a base surface defined between the leading, trailing, and lateral edges;
   a leading edge pad formed on the base surface aligned with the leading edge and extending from the leading edge alongside but slightly offset from the lateral edges;
   intermediate pads formed on the leading edge pad near the leading edge;
   a trailing edge pad formed on the base surface adjacent to the trailing edge, the trailing edge pad comprising three trailing edge pads, two of which are very similar and are located adjacent to opposite corners of the trailing edge, said two trailing edge pads being tapered, streamlined shapes and being smaller than a third one of the trailing edge pads; and
   a concave pad on the third one of the trailing edge pads, the concave pad having a leading edge with a mild concavity with an aspect ratio in a range of approximately 0.1 to 0.8.

2. The disk drive slider of claim 1, wherein the intermediate pads and the concave pad are formed at a shallow etch depth, and the leading edge pad and trailing edge pad are formed at the deep etch depth.

3. The disk drive slider of claim 2, wherein the shallow etch depth is approximately 0.18 microns, and the deep etch depth is approximately 1.7 microns.

4. The disk drive slider of claim 1, wherein said third one of the trailing edge pads is located between said two trailing edge pads along the longitudinal axis and abuts the trailing edge.

5. A system for improving multiple velocity fly height performance, flat profile performance, and write element protrusion compensation of a disk drive slider, the system comprising:
   a disk drive having a media disk, an actuator having a slider with a read/write head for reading data from and writing data to the media disk; the slider further comprising:
   a trailing edge;
   a trailing edge pad formed adjacent to the trailing edge;
   a concave pad formed on the trailing edge pad, the concave pad having a leading edge with a mild concavity with an aspect ratio in a range of approximately 0.1 to 0.8;
   at a media disk velocity of x rpm, the slider has a fly height of a nm relative to the media disk, and at a servo writing velocity of y rpm (y<x) for writing a servo pattern, the slider has a fly height of b nm (b>a); and wherein
   write current is sent to a write element in the slider, which swells the write element, thereby reducing the fly height between the slider and the media disk, but wherein the concave pad compensates for the reduction in fly height.

6. The system of claim 5, wherein at the media disk velocity of about 10,000 rpm, the fly height of the slider is about 10 nm, and at the servo writing velocity of about 3,780 rpm, the fly height of the slider is about 11 nm.

7. The system of claim 6, wherein the media disk velocity is at an altitude of about 10,000 feet, and the servo writing velocity is at an altitude of about sea level.

8. The system of claim 5, wherein at sea level and at the media disk velocity, the fly height of the slider is greater than the fly height of the slider at the servo writing velocity at sea level.

9. The system of claim 5, wherein the slider has a flat profile as it scans the media disk from an inner diameter to an outer diameter of the media disk, with a low fly height sigma, low fly height loss during track seek, and low fly height loss during operation at high altitudes.

10. A method of improving multiple velocity fly height performance, flat profile performance, and write element protrusion compensation of a disk drive slider, the method comprising:
(a) providing a disk drive;
(b) rotating a media disk in the disk drive at a media disk velocity of x rpm and flying the slider at a fly height of a nm relative to the media disk;
(c) rotating the media disk at a servo writing velocity of y rpm (y<x) to write a servo pattern and flying the slider at a fly height of b nm (b>a); and
(d) sending write current to a write element in the slider to swell the write element and thereby reducing the fly height between the slider and the media disk, but compensating for the reduction in fly height with an air bearing surface of the slider.

11. The method of claim 10, wherein step (b) comprises the media disk velocity of about 10,000 rpm and the fly height of about 10 nm, and step (c) comprises the servo writing velocity of about 3,780 rpm and the fly height of about 11 nm.

12. The method of claim 11, wherein step (b) is performed at an altitude of about 10,000 feet, and step (c) is performed at an altitude of about sea level.

13. The method of claim 10, further comprising operating the disk drive at sea level at the media disk velocity such that the fly height of the slider is greater than the fly height of the slider at the servo writing velocity at sea level.

14. The method of claim 10, scanning the media disk in a flat profile with the slider from an inner diameter to an outer diameter of the media disk, with a low fly height sigma, low fly height loss during track seek, and low fly height loss during operation at high altitudes.

15. The system of claim 5, wherein the trailing edge pad comprises three trailing edge pads, two of which are very similar and are located adjacent to opposite corners of the trailing edge, said two trailing edge pads being tapered, streamlined shapes and being smaller than a third one of the trailing edge pads.

16. The method of claim 10, further comprising forming the trailing edge pad as three trailing edge pads, two of which are very similar and are located adjacent to opposite corners of the trailing edge, said two trailing edge pads being tapered, streamlined shapes and being smaller than a third one of the trailing edge pads.

* * * * *

UNITED STATES PATENT AND TRADEMARK OFFICE
CERTIFICATE OF CORRECTION

PATENT NO. : 7,324,306 B2 Page 1 of 1
APPLICATION NO. : 10/844100
DATED : January 29, 2008
INVENTOR(S) : Oscar Jaime Ruiz It is certified that error appears in the above-identified patent and that said Letters Patent is hereby corrected as shown below:

On Title Page, item (73) Assignee: delete "Hitachiglobal" and replace with --Hitachi Global--

Signed and Sealed this

Twentieth Day of May, 2008

JON W. DUDAS
*Director of the United States Patent and Trademark Office*